(12) United States Patent
Sharan et al.

(10) Patent No.: US 11,455,648 B2
(45) Date of Patent: Sep. 27, 2022

(54) ADMINISTRATION OF AN INCENTIVE PROGRAM ENCOURAGING PUBLIC TRANSPORT USAGE

(71) Applicant: MASTERCARD INTERNATIONAL INCORPORATED, Purchase, NY (US)

(72) Inventors: Ashutosh Sharan, Gurgaon (IN); Panchsheel Mittal, Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 258 days.

(21) Appl. No.: 16/013,998

(22) Filed: Jun. 21, 2018

(65) Prior Publication Data
US 2018/0374112 A1 Dec. 27, 2018

(30) Foreign Application Priority Data

Jun. 21, 2017 (SG) .............................. 10201705159P

(51) Int. Cl.
*G06Q 30/02* (2012.01)
*G06Q 50/30* (2012.01)

(52) U.S. Cl.
CPC ......... *G06Q 30/0207* (2013.01); *G06Q 50/30* (2013.01)

(58) Field of Classification Search
None
See application file for complete search history.

(56) References Cited

U.S. PATENT DOCUMENTS

| 9,390,431 | B2 * | 7/2016 | Fletcher | G06Q 30/0226 |
| 2009/0106101 | A1 * | 4/2009 | Green | G06Q 10/08 705/14.23 |
| 2012/0109721 | A1 * | 5/2012 | Cebon | G06Q 30/06 705/13 |
| 2012/0232776 | A1 * | 9/2012 | Gontmakher | G06Q 10/025 701/117 |
| 2013/0054281 | A1 * | 2/2013 | Thakkar | G06Q 30/0207 705/5 |
| 2014/0039988 | A1 * | 2/2014 | Londergan | G06Q 30/0207 705/14.1 |

(Continued)

*Primary Examiner* — Chrystina E Zelaskiewicz
(74) *Attorney, Agent, or Firm* — Harness, Dickey & Pierce, P.L.C.

(57) ABSTRACT

An incentive program manager is provided for administering an incentive program encouraging public transport usage. The incentive program manager includes a processor, a memory including computer program code, and an input port. The input port is configured to receive an indication of usage of a public transport facility by a participant registered with the incentive program and an indication of usage of a private transport facility registered with the incentive program and owned by the participant. The memory and the computer program code are configured to, with the processor, cause the incentive program manager to: determine a reward to the participant for the usage of the public transport facility and a penalty for the usage of the private transport facility; provide data indicative of the determined reward and the determined penalty; and update a balance in a member account with the determined reward and the determined penalty.

14 Claims, 8 Drawing Sheets

(56) References Cited

U.S. PATENT DOCUMENTS

| | | | |
|---|---|---|---|
| 2014/0288982 A1* | 9/2014 | Chidlovskii | G06Q 10/025 |
| | | | 705/6 |
| 2014/0310192 A1* | 10/2014 | Boss | G06Q 50/265 |
| | | | 705/325 |
| 2017/0223507 A1* | 8/2017 | Turner | G06Q 50/30 |
| 2018/0109916 A1* | 4/2018 | Sprogis | G06Q 20/3278 |
| 2018/0268510 A1* | 9/2018 | Edakunni | G06Q 50/30 |
| 2021/0142419 A1* | 5/2021 | Davis | G06Q 30/0207 |

* cited by examiner

ADMINISTRATION OF AN INCENTIVE PROGRAM ENCOURAGING PUBLIC TRANSPORT USAGE

CROSS-REFERENCE TO RELATED APPLICATION

This application claims the benefit of and priority to Singapore Patent Application No. 10201705159P filed Jun. 21, 2017. The entire disclosure of the above application is incorporated herein by reference.

FIELD

The following generally discloses a device and method to administer an incentive program encouraging public transport usage.

BACKGROUND

This section provides background information related to the present disclosure which is not necessarily prior art.

Schemes exist to reduce carbon dioxide emission. For example, at a macro level, there is the Kyoto Protocol, which lays down legally binding targets and timetables for industrialised countries to reduce carbon dioxide emission.

At the micro or consumer level, one way to reduce carbon dioxide emission is to seek to lower carbon footprint attributable to vehicle fuel consumption. One area which can be looked into is to discourage private vehicle owners from using their own vehicles as a means of transport, and use public transport instead.

However, private vehicle owners may be reluctant to forego commuting using their own vehicles and use public transport. There is thus a need to motivate such private vehicle owners to use public transport.

Other desirable features and characteristics will become apparent from the subsequent detailed description and the appended claims, taken in conjunction with the accompanying drawings and this background of the present disclosure.

SUMMARY

This section provides a general summary of the disclosure, and is not a comprehensive disclosure of its full scope or all of its features. Aspects and embodiments of the disclosure are set out in the accompanying claims.

According to a first aspect, there is provided an incentive program manager for administering an incentive program encouraging public transport usage, the incentive program manager including: at least one processor; and at least one memory including computer program code; an input port coupled to the processor, the input port configured to receive an indication of usage of a public transport facility by a participant registered with the incentive program and an indication of usage of a private transport facility registered with the incentive program and owned by the participant; the at least one memory and the computer program code configured to, with the at least one processor, cause the incentive program manager at least to: determine a reward to the participant for the usage of the public transport facility and a penalty for the usage of the private transport facility; provide, to a repository for recording incentives awarded in the incentive program, data indicative of the determined reward and the determined penalty; and update a balance in a member account maintained in the repository with the determined reward and the determined penalty, the member account being linked to the participant registered with the incentive program.

According to a second aspect, there is provided an incentive program manager for administering an incentive program encouraging public transport usage, the incentive program manager including: at least one processor; and at least one memory including computer program code; an input port coupled to the processor, the input port configured to receive an indication of usage of a private transport facility registered with the incentive program and owned by a participant registered with the incentive program; the at least one memory and the computer program code configured to, with the at least one processor, cause the incentive program manager at least to: determine a penalty for the usage of the private transport facility; provide, to a repository for recording incentives awarded in the incentive program, data indicative of the determined penalty; and update a balance in a member account maintained in the repository account with the determined penalty, the member account being linked to the participant registered with the incentive program.

According to a third aspect, there is provided a method of administering an incentive program encouraging public transport usage, the method including: receiving an indication of usage of a private transport facility registered with the incentive program and owned by a participant registered with the incentive program; determining a penalty for the usage of the private transport facility; providing data indicative of the determined penalty; and updating a balance in a member account with the determined penalty, the member account being linked to the participant registered with the incentive program.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The accompanying drawings, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the present disclosure are described hereinafter with reference to the following drawings, in which:

FIG. 1A shows a schematic of a system which may be used to support an incentive program encouraging public transport usage.

FIG. 1B provides a schematic diagram of functional modules present in the incentive program manager of FIG. 1A.

Again, corresponding reference numerals indicate corresponding parts throughout the several views of the drawings.

DETAILED DESCRIPTION

Figure 1A:
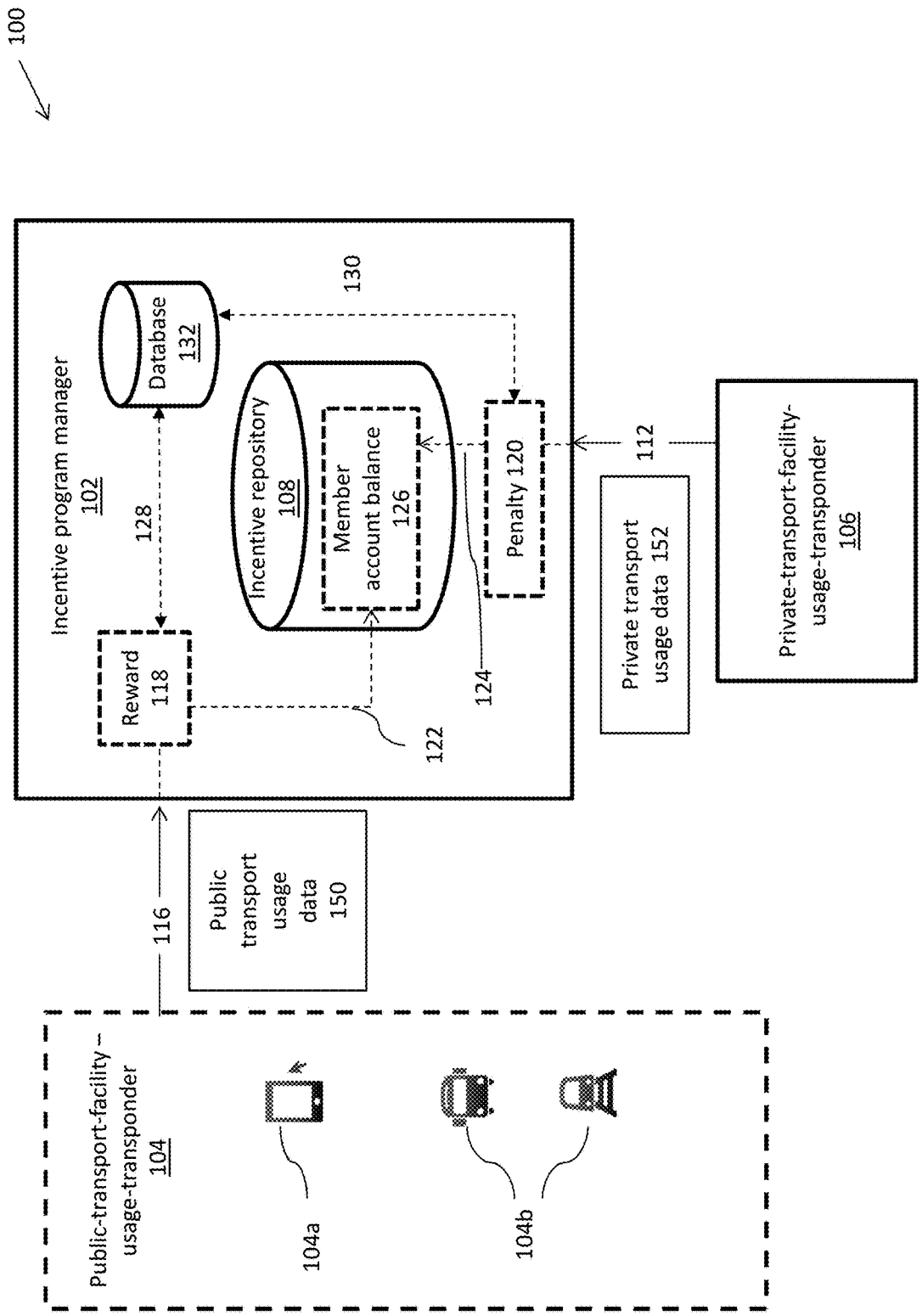

Embodiments of the present disclosure will be described, by way of example only, with reference to the drawings. The description and specific examples included herein are intended for purposes of illustration only and are not intended to limit the scope of the present disclosure.

Overview

Various embodiments of the present disclosure provide a method and a system that supports an incentive program encouraging public transport usage. The incentive program seeks to reduce pollution and/or congestion brought about by private vehicle usage. Accordingly, in this incentive program, incentives are awarded to participants who utilize public transport when commuting, preferably when such participants owns, leases or otherwise has use of a means of transport (hereafter interchangeably referred to as a "private transport facility"). However, should the participants continue using their personal private transport facility to commute, the participants are then penalized.

When a participant registers with the incentive program, details that allow the incentive program to track the manner in which the participant commutes are obtained. These details include information of a transponder installed in the participant's private transport facility and information of a fare card (which may be in physical or digital form) that the participant charges when taking public transport. Such information allows the system implementing the incentive program to track which mode of transport that the participant uses because the system is notified when the registered private transport facility or the fare card is used. The participant is rewarded when using public transport or penalized when using their private transport facility. The reward may be in the form of awarded points, while the penalty results in deduction of these points.

The system implementing the incentive program determines the number of points that are awarded or deducted using a tiered approach. For example, more points are awarded should the participant continuously use public transport over an uninterrupted interval and the commuted distance is above a threshold level. The points awarded may also depend on the mode of public transport, e.g., a vehicle with a larger passenger capacity (like a train) would earn more points compared to one with a smaller passenger capacity (like a taxi). Fewer points are deducted if the private transport facility has a lower carbon footprint, such as if it is a motor vehicle running on electric or has a hybrid engine. This system also maintains a database to record each participant's points from partaking in the incentive program. Each participant's account is updated when points are earned from using public transport, or subtracted when using private transport or redeemed under a merchant loyalty program in collaboration with the operator of the incentive program.

By penalizing participants when using their privately owned transport facility and rewarding them for using public transport, the incentive program according to embodiments of the disclosure, thus seeks to encourage use of public transport. Accordingly, such an incentive program is advantageous for providing a solution that can reduce or manage congestion and pollution, both being major problems for developed cities. Also, after a participant is enrolled into the incentive program, usage becomes convenient as no further action is required to monitor participation in the program since the system automatically detects for usage of privately owned transport facility or public transport and updates a participant's account accordingly.

Terms Description (in Addition to Dictionary Meaning of Terms)

Public transport refers to a shared passenger transport service which is available for use by the general public, where the cost of transportation to the participant is subsidised or reduced from being shared by fellow passengers. A public transport facility refers to any one public transport mode, such as a taxicab, carpooling, buses (including those that are privately chartered; and those belonging to a government administered company and ply along a regular route).

A private transport facility may refer to a vehicle that is registered under the participant's name, where the cost of transportation to the participant is entirely borne by the participant. It should also be noted that the incentive program will treat a private transport facility as a public transport facility when the privately owned vehicle is made available for public hire, for example, through a carpooling application like Uber® or Grab®, and when the privately owned vehicle is used in such a public hire mode.

A reward refers to credit given in recognition of the participant foregoing using their private transport in favour of using public transport to commute. The reward may be in the form of awarded points which are stored in an account which is created for the participant to record rewards or penalties from use of the incentive program.

A penalty refers to a debit imposed when the participant uses their private transport, rather than public transport, to commute. The debit may be in the form of points deducted from those stored in an account which is created for the participant to record rewards or penalties from use of the incentive program.

Incentives that are awarded to the participant include points that may be redeemed for items, cash vouchers, coupons, or converted into points under a merchant loyalty program. Examples of items include a good (such as a household appliance) or a service (such as a spa treatment); coupons include a ticket or document that can be exchanged for a financial discount or rebate when purchasing a product and/or service; while a merchant loyalty program refers to a reward program run by a merchant to encourage purchasing from the same merchant, where points earned in the reward program are redeemed on a good and/or service offered by the merchant.

A member account refers to a record created in a repository, used by an incentive program manager, to monitor rewards or penalties from use of the incentive program. Each member account is linked to a participant by being created under the participant's name, so that when the incentive program manager detects usage of privately owned transport facility or public transport by the participant, the member account is updated accordingly.

Exemplary Embodiments

Embodiments of the present disclosure will be described, by way of example only, with reference to the drawings. Like reference numerals and characters in the drawings refer to like elements or equivalents.

FIG. 1A shows a schematic of a system 100 which may be used to support an incentive program encouraging public transport usage. In this incentive program, incentives are awarded to participants who utilize public transport when commuting, preferably where such participants owns, leases or otherwise has use of a means of transport (hereafter interchangeably referred to as a "private transport facility").

The system 100 has an incentive program manager 102, a public-transport-facility-usage-transponder 104 and a private-transport-facility-usage-transponder 106.

The incentive program manager 102 may be implemented as one or more server terminals that administer the incentive program encouraging public transport usage. The incentive program manager 102 is in electrical communication with both the public-transport-facility-usage-transponder 104 and the private-transport-facility-usage-transponder 106 to receive data streams from both of these transponders. These data streams provide the incentive program manager 102 with the necessary data for its programmed logic to perform the administration of the incentive program. The incentive program manager 102 may also include a repository 108 for recording incentives awarded in the incentive program.

The public-transport-facility-usage-transponder 104 is preferably an electronic wireless transceiver used to notify the incentive program manager 102 whenever it is detected that a participant, registered with the incentive program, has utilized a public transport facility that is monitored by the public-transport-facility-usage-transponder 104. The public-transport-facility-usage-transponder 104 transmits 116 an indication of usage of its monitored public transport facility by the registered participant.

The public-transport-facility-usage-transponder 104 may be one of several electronic devices, such as a mass market consumer product like a mobile terminal 104a, which includes goods like a laptop computer, smartphone, smartwatch or a tablet; or a product specifically designed for the public transport facility, like a fare calculation sensor.

To support the incentive program administered by the incentive program manager 102, the mobile terminal 104a typically runs an operating system. The operating system hosts one or more mobile applications, including one that is configured to notify the incentive program manager 102 when usage of a public transport facility is detected. For example, in the scenario where the public transport facility is a carpool, the usage of the carpool is detected when the incentive program manager 102 receives a message from a transport application activated during the usage of the public transport facility, the transport application being installed in the mobile terminal 104a. Such a transport application includes a carpooling application like Uber® or Grab® and the message sent by the transport application contains data establishing a link to the participant registered with the incentive program. Alternatively, the message may not be received directly from the carpooling application. The carpooling application may signal to another mobile terminal 104a application, specifically designed to communicate with the incentive program manager 102, of the usage of the public transport facility, where this specifically designed application then transmits 116 such usage to the incentive program manager 102.

The linkage to the participant of the incentive program, being provided in the message sent by the carpooling application or the specifically designed application, serves to identify that the message from the transport application is indeed from a mobile terminal 104a belonging to the participant. Such linkage may be established using an identifier assigned to the carpooling application or the specifically designed application during download or set-up in the mobile terminal 104a. This identifier is acquired as part of the data provided when the participant registers with the incentive program manager 102. For example, during this registration, the incentive program manager 102 may request access to the necessary applications installed in the mobile terminal 104a that are required to detect that the participant is using a public transport facility. When such access is granted, the incentive program manager 102 will obtain the identifier for the carpooling application or the specifically designed application. Other identifiers may be used, such as an electronic address used to register the participant with the incentive program administered by the incentive program manager 102, where this electronic address is also used during the registration of the carpooling application or the specifically designed application. The electronic address may, for example, be a unique identifier of the mobile terminal 104a, such as its IMEI code (International Mobile Equipment Identity). Alternatively, the electronic address may be an email address.

Such identifiers may also be used to identify a registered participant in the incentive program when detection of usage of a public transport facility is through a payment instrument being charged a public transport facility usage fare, where the payment instrument is owned by the registered participant (i.e., the payment instrument is issued under the name of the registered participant). Such a fare is charged when the payment instrument is used at a fare calculation sensor (such as a ticket gantry or a RFID card detector) associated with the public transport facility. The payment instrument, being any one of a stored value payment card, a credit card or a debit card, is stored in electronic form in a digital wallet application installed in the mobile terminal 104a. The digital wallet application will then notify the incentive program manager 102 that a fare has been charged to one of its stored payment instruments. The incentive program manager 102 will then be able to trace the participant through an identifier assigned to the digital wallet application during its installation in the mobile terminal 104a or an electronic address used to register the digital wallet application during its installation. Additional identifiers include using the personal account number (PAN) of the payment instrument to perform the trace. The digital wallet application may be provided with access to an image capturing device of the mobile terminal 104a, such as its camera, to scan a ticket issued for travel on the public transport facility. In this implementation, the digital wallet application captures an optical code (e.g., a quick response (QR) code or a barcode) printed on the issued ticket.

By establishing that data signals, transmitted by the mobile terminal 104a in respect of usage of a public transport facility are due to registered participant activity, activation of any one of the carpooling application, the specifically designed application or the digital wallet application, will cause the incentive program manager 102 to receive 116 an indication of usage of the public transport facility from the mobile terminal 104a.

While use of mass market consumer products have been described thus far, the public-transport-facility-usage-transponder 104 can also be realized by electronic devices specifically designed for the public transport facility, as mentioned above. Such specifically designed electronic devices may be fixtures associated with the public transport facility, like a fare calculation sensor 104b installed, for example, at ticket gantries of a train station or at an entrance or exit of a bus. An RFID sensor of the fare calculation sensor 104B captures use of a payment instrument when the payment instrument is brought in proximity to the fare calculation sensor 104b at the point of entry or exit. The fare calculation sensor 104b will then notify (either directly or through the use of one or more servers (not shown)) the incentive program manager 102 about a fare charged to the payment card. The incentive program manager 102 may then establish whether the payment card is linked to a participant in the incentive program, for example, through using the personal account number (PAN) of the payment instrument.

The private-transport-facility-usage-transponder 106 is preferably an electronic wireless transceiver used to notify the incentive program manager 102 whenever it is detected that a participant, registered with the incentive program, has utilized a private transport facility that is monitored by the public-transport-facility-usage-transponder 104. In one embodiment, the private-transport-facility-usage-transponder 106 is a telematics system installed in the private transport facility, such as a navigation system that is built into a private vehicle owned by the registered participant. The telematics system automatically activates when the private vehicle is started and tracks a distance that the private vehicle travels. The telematics system will then notify the incentive program manager 102 of this travelling distance. In this manner, the private-transport-facility-usage-transponder 106 transmits 112 an indication of usage of its monitored private transport facility by the registered participant. It is also possible that the vehicle installed telematics system passes on details of the traveled distance to the specifically designed application or the digital wallet application installed in the mobile terminal 104a, which in turn forwards the traveled distance to the incentive program manager 102. Use of a vehicle installed telematics system for the private-transport-facility-usage-transponder 106 is preferred since the telematics system automatically activates when the private transport facility is started and is not typically deactivated, so that it is more difficult for the registered participant to avoid being penalized from using the private transport facility. In comparison, if an application installed in the mobile terminal 104a is used to track usage of the private transport facility, the registered participant may simply deactivate the application when using the private transport facility so as to avoid being penalized.

After a registered participant completes a journey using public transport, the incentive program manager 102 receives 116 from the public-transport-facility-usage-transponder 104 a data packet 150 providing details of the usage of the public transport facility, such details providing information such as the type of public transport taken (e.g., bus, train) and the distance traveled. The incentive program manager 102 then determines a reward 118 for the registered participant for such usage.

On the other hand, after a registered participant completes a journey using their private transport, the incentive program manager 102 receives 112 from the private-transport-facility-usage-transponder 106 a data packet 152 providing details of the usage of the private transport facility. The incentive program manager 102 then determines a penalty 120 for the registered participant for such usage. Subsequently, the incentive program manager 102 provides 122 data indicative of the determined reward 118 to the repository 108 for recording incentives awarded in the incentive program. Similarly, the incentive program manager 102 provides 124 data of the determined penalty 120 to this repository 108. The incentive program manager 102 updates a balance 126 in a member account maintained in the repository 108 with the determined reward 118 and the determined penalty 120, the member account being linked to the user registered with the incentive program. Typically, updating the balance 126 involves adjusting the number of points remaining in the member account by adding the numerical value of the determined reward 118 and subtracting the numerical value of the determined penalty 120.

While FIG. 1A shows that the repository 108 is integrated with the incentive program manager 102, it is also possible to have the repository 108 hosted in a terminal external to the incentive program manager 102. In such an implementation (not shown), the incentive program manager 102 transmits, to the externally located repository, the data indicative of the determined reward and the determined penalty. The incentive program manager 102 also transmits, to the externally located repository, an instruction to update the resulting balance in the member account resulting from factoring in the determined reward and the determined penalty.

In another implementation (not shown), the incentive program manager 102 may only focus on determining a penalty when a private transport facility is used, whereby the reward for using a public transport facility is administered by another terminal. In this other implementation, the incentive program manager 102 receives an indication of usage of the private transport facility registered with the incentive program and owned by a participant registered with the incentive program. The incentive program manager 102 determines a penalty for the usage of the private transport facility and provides, to a repository for recording incentives awarded in the incentive program, data indicative of the determined penalty. The incentive program manager 102 then updates a balance in a member account maintained in the repository 108 account with the determined penalty, the member account being linked to the participant registered with the incentive program.

Returning to FIG. 1A, the incentive program manager 102 determines, in one embodiment, the penalty 120 and the reward 118 by comparing 128, 130 the usage of the private transport facility and the usage of the public transport facility against one or more metrics or criteria stored in a database 132. This comparison criteria is changeable through a command received by the incentive program manager 102, so that the determined reward 118 and the determined penalty 120 can be dynamically changed, in accordance with terms and conditions set by a merchant that honours redemptions made against the balance 126 maintained in a member account. Similar to the repository 108, while FIG. 1A shows that the database 132 is integrated with the incentive program manager 102, an alternative implementation (not shown) has the database hosted in an external terminal.

As part of the participant registration process, the incentive program manager 102 requires, in one implementation, submission of details of both the public transport facility and the private transport facility, of which their respective usage is being monitored. This notifies the incentive program manager 102 of the public transport facility which usage will be rewarded, and the private transport facility which usage will be penalized. Accordingly, before receipt of the indication of the usage of the private transport facility, the incentive program manager 102 may be further configured to receive registration details of the private transport facility. Similarly, before receipt of the indication of the usage of the public transport facility, the incentive program manager 102 is further configured to receive details of one or more public transport modes for enrollment under the public transport facility.

The incentive program manager 102 also uses, in one implementation, the received registration details of the private transport facility for authentication purposes, by identifying that the received registration details match the detected usage of the private transport facility. Similarly, in this implementation, the incentive program manager 102 performs authentication of the usage of the public transport facility through identification of a match to one of the enrolled public transport modes.

It was earlier mentioned that a private transport facility would be treated as a public transport facility when the privately owned vehicle is made available for public hire. To support this scenario, the incentive program manager 102 is further configured to establish whether the registered private transport facility is also registered for such a public hire scheme. The incentive program manager 102 then converts the determined penalty into a reward when the establishment indicates that the usage of the registered private transport facility is under the public hire scheme. Thus, the incentive program manager 102 does not penalize the registered participant if his or her privately owned vehicle is used in a manner that helps to reduce carbon footprint contribution attributable to transportation.

Figure 1B:
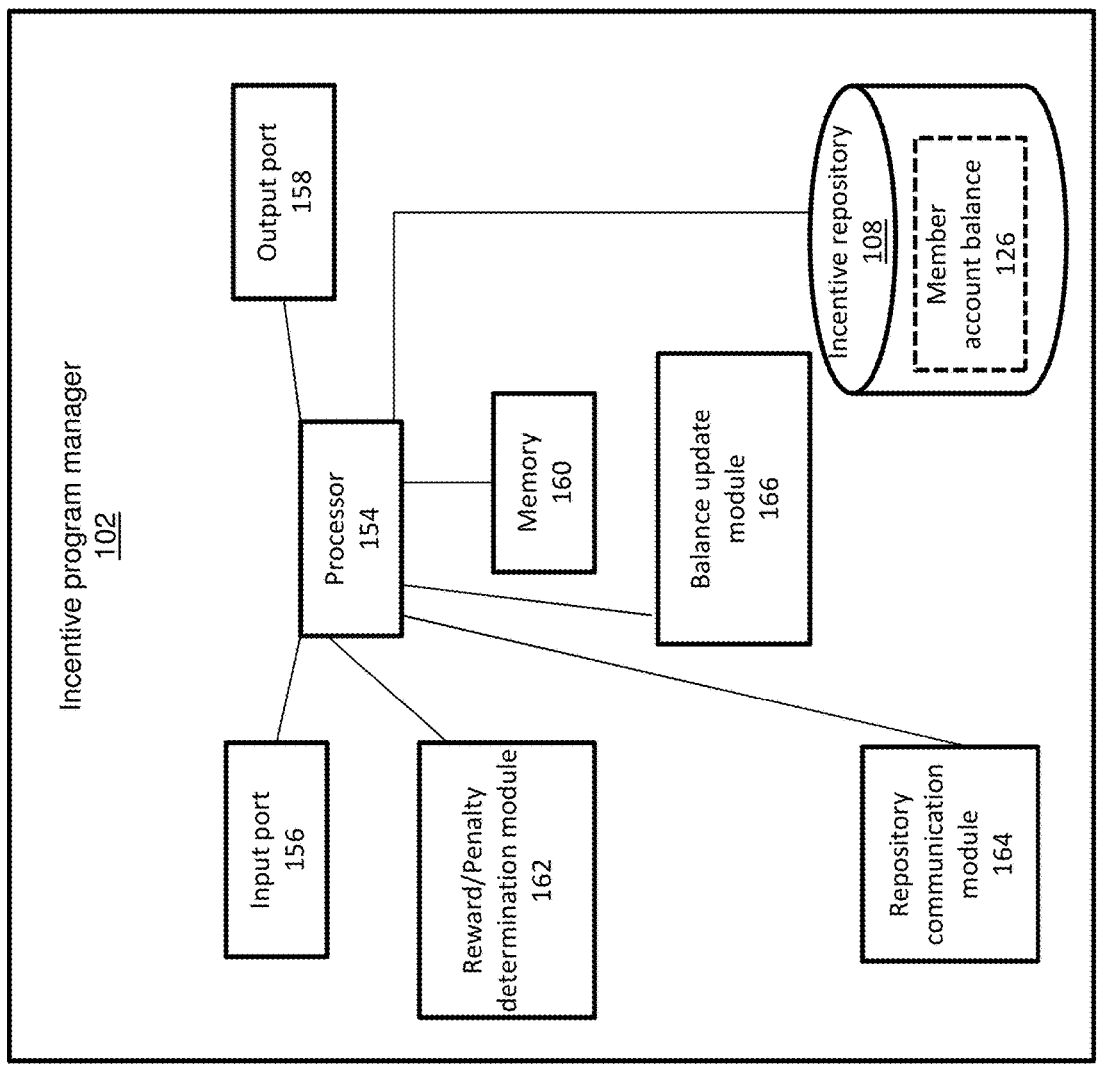

FIG. 1B provides a schematic diagram of functional modules present in the incentive program manager 102 of FIG. 1A.

The incentive program manager 102 further includes a processor 154, a memory 160, an input port 156, an output port 158, a reward/penalty determination module 162, a repository communication module 164 and a balance update module 166. The incentive program manager 102 also includes an incentive repository 108, although this incentive repository 108 is externally located in another implementation (not shown).

Each of the memory 160, the input port 156, the output port 158, the reward/penalty determination module 162, the repository communication module 164 and the balance update module 166 is coupled to the processor 154, so that their respective operations can be controlled by the processor 154. The memory 160 stores computer program code that the processor 154 compiles to have each of the reward/penalty determination module 162, the repository communication module 164 and the balance update module 166 perform their respective functions.

Each of the reward/penalty determination module 162, the repository communication module 164 and the balance update module 166 can be implemented using one or more processors present in the incentive program manager 102.

With reference to FIG. 1A, the reward/penalty determination module 162 is configured to receive details of a registered participant's usage of a public transport facility or a private transport facility. The reward/penalty determination module 162 is further configured to determine a reward to the participant for the usage of the public transport facility and a penalty for the usage of the private transport facility.

The repository communication module 164 is configured to communicate with the incentive repository 108. The repository communication module 164 transmits to the incentive repository 108 data indicative of the determined reward and the determined penalty, as calculated by the reward/penalty determination module 162.

The balance update module 166 is also configured to communicate with the incentive repository 108. The balance update module 166 is configured to instruct the incentive repository 108 to update a balance in a member account maintained in the incentive repository 108 with the determined reward and the determined penalty. The member account that is updated belongs to the participant determined to have used their private transport facility or has taken public transport.

Figure 2:
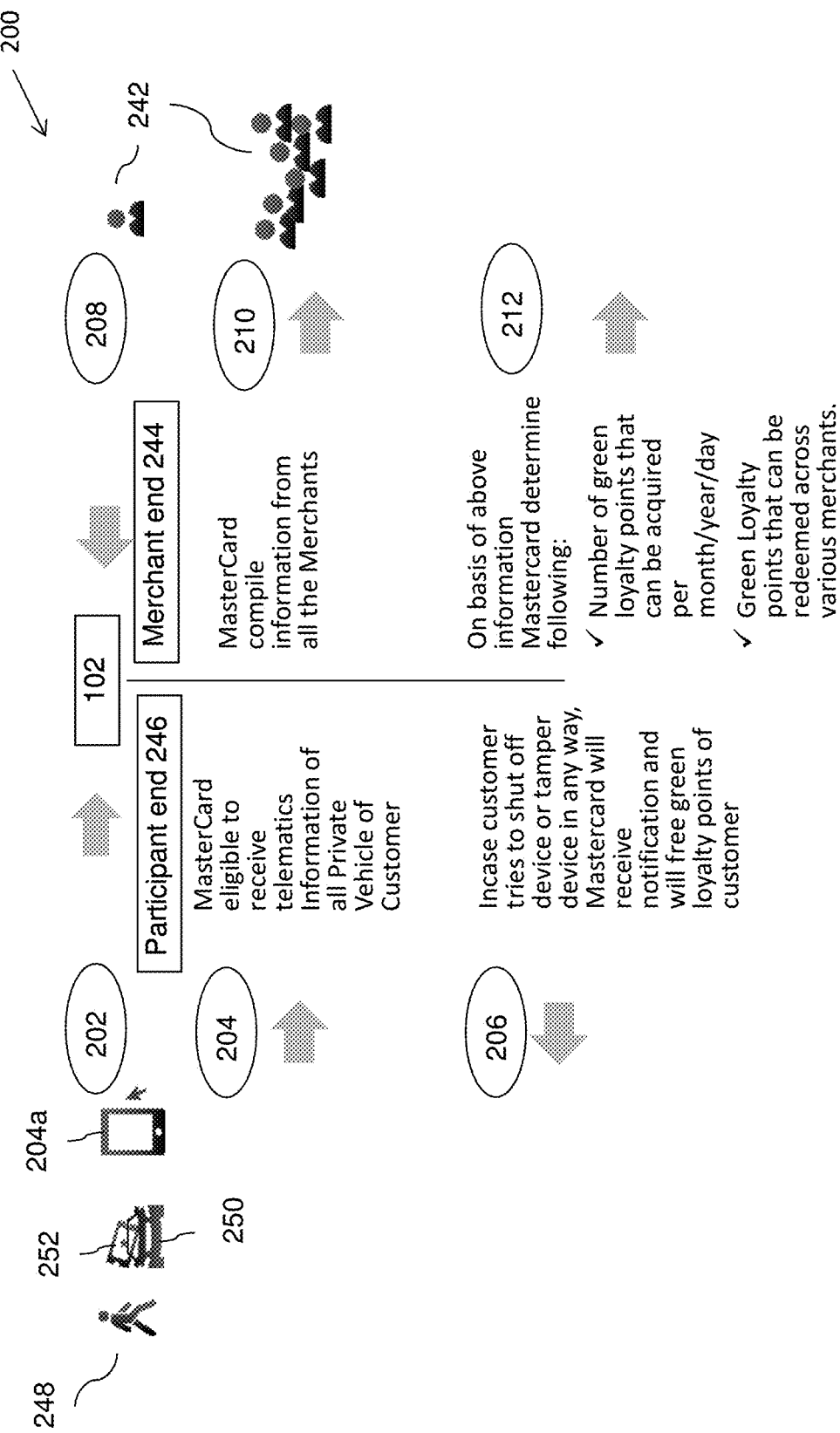
FIG. 2 illustrates a possible sequence which the system of FIG. 1A may use to onboard parties into the incentive program administered by the incentive program manager of FIG. 1A.

FIG. 2 illustrates a possible sequence 200 which the system 100 of FIG. 1A uses to onboard parties into the incentive program administered by the incentive program manager 102. The sequence 200 has two sides, a participant end 246, catering to a participant 248 who seeks to earn incentives when commuting using public transport, and a merchant end 244 catering to a merchant 242 who provides the incentives to the participant 248.

At the participant end 246, a pre-requisite 202 for the sequence 200 is that the participant 248 has a privately owned vehicle 250 with an installed telematics device 252, like Honda Connect®, and that there is a supporting application installed in a mobile terminal 204a which is able to communicate with the incentive program manager 102.

The participant 248 registers 204 his private transport facility (i.e. the privately owned vehicle 250) by providing the supporting application with information in respect of the installed telematics device 252. Although not shown, the participant 248 also registers details of the public transport facility which the participant 248 will use to commute in lieu of his privately owned vehicle 250.

From having received the telematics device 252 details, the incentive program manager 102 obtains specification data of the privately owned vehicle 250, such as the fuel used (e.g., petrol or diesel) and the year of purchase. Alternatively, these details are entered by the participant 248 during the registration 204. These details are required because they are taken into consideration when calculating the penalty for using the privately owned vehicle 250. For example, diesel vehicles and older vehicles have a higher carbon footprint compared to petrol vehicles and newer vehicles.

Receipt of the telematics device 252 details also results in the incentive program manager 102 being notified when the privately owned vehicle 250 is used, since this also causes the telematics device 252 to automatically start. The incentive program manager 102 then receives data on a distance that the privately owned vehicle 250 travels, which is used to compute the penalty for usage of a private transport facility.

The supporting application returns 206 a message that any reward points will be revoked should the registered telematics device 252 be detected to be tampered with or shut down while the privately owned vehicle 250 is being used.

At the merchant end 244, the merchant 242 registers 208 for the incentive program and provides details of a corporate social responsibility (CSR) fund to which the merchant 242 wishes to contribute. The merchant 242 may also provide an indication of the incentives it wishes to pledge to the incentive program.

The incentive program manager 102 then compiles 210 a list of all the merchants 242 that are partaking in the incentive program and their pledged contribution, in order to determine 212 the pool of incentives that are available for distributing as rewards to the participant 248 for using public transport.

Figure 3A:
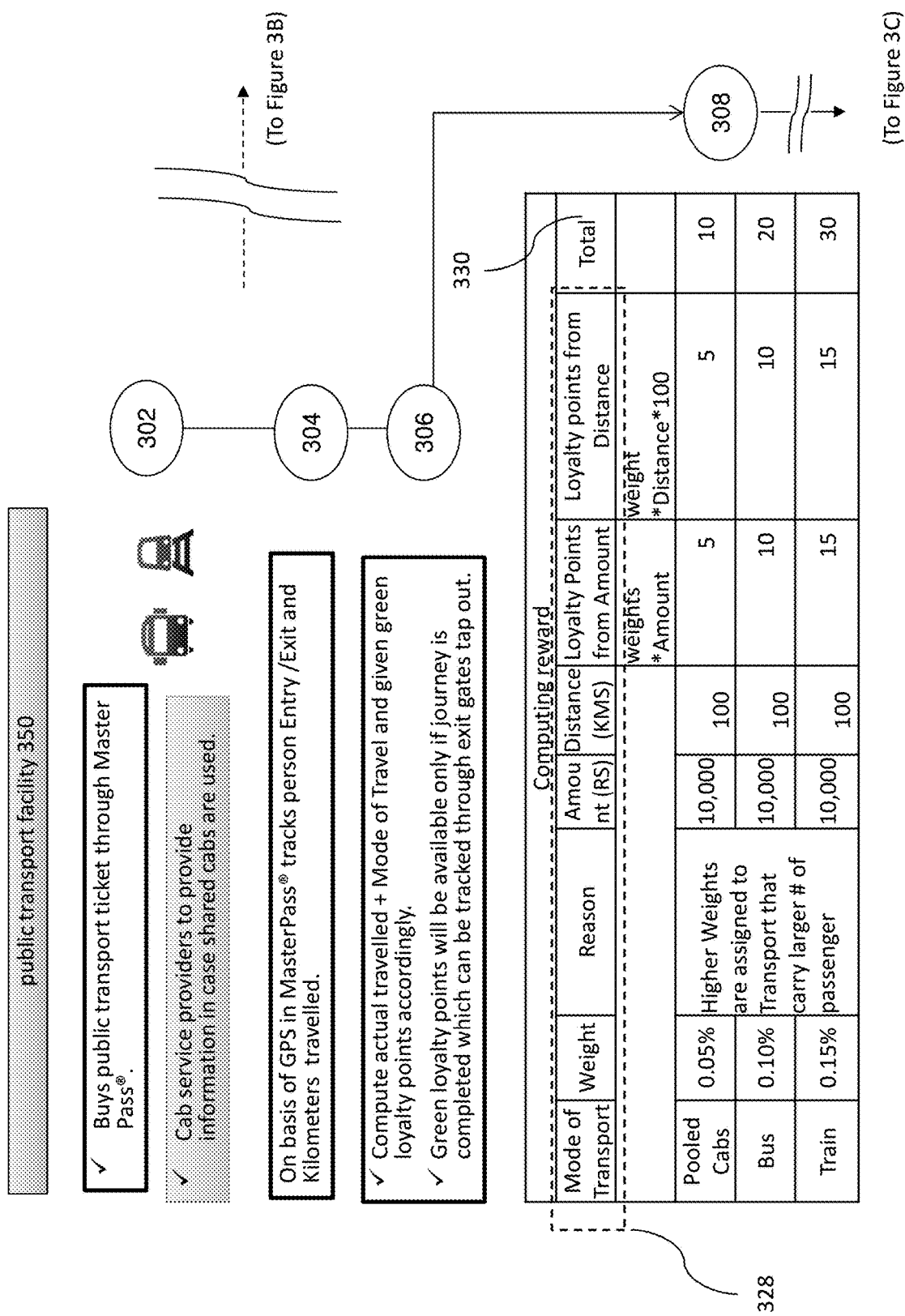
FIGS. 3A, 3B and 3C illustrate further detail on the stages that may occur in each of the two travel options administered by the incentive program manager of FIG. 1A.
Figure 3B:
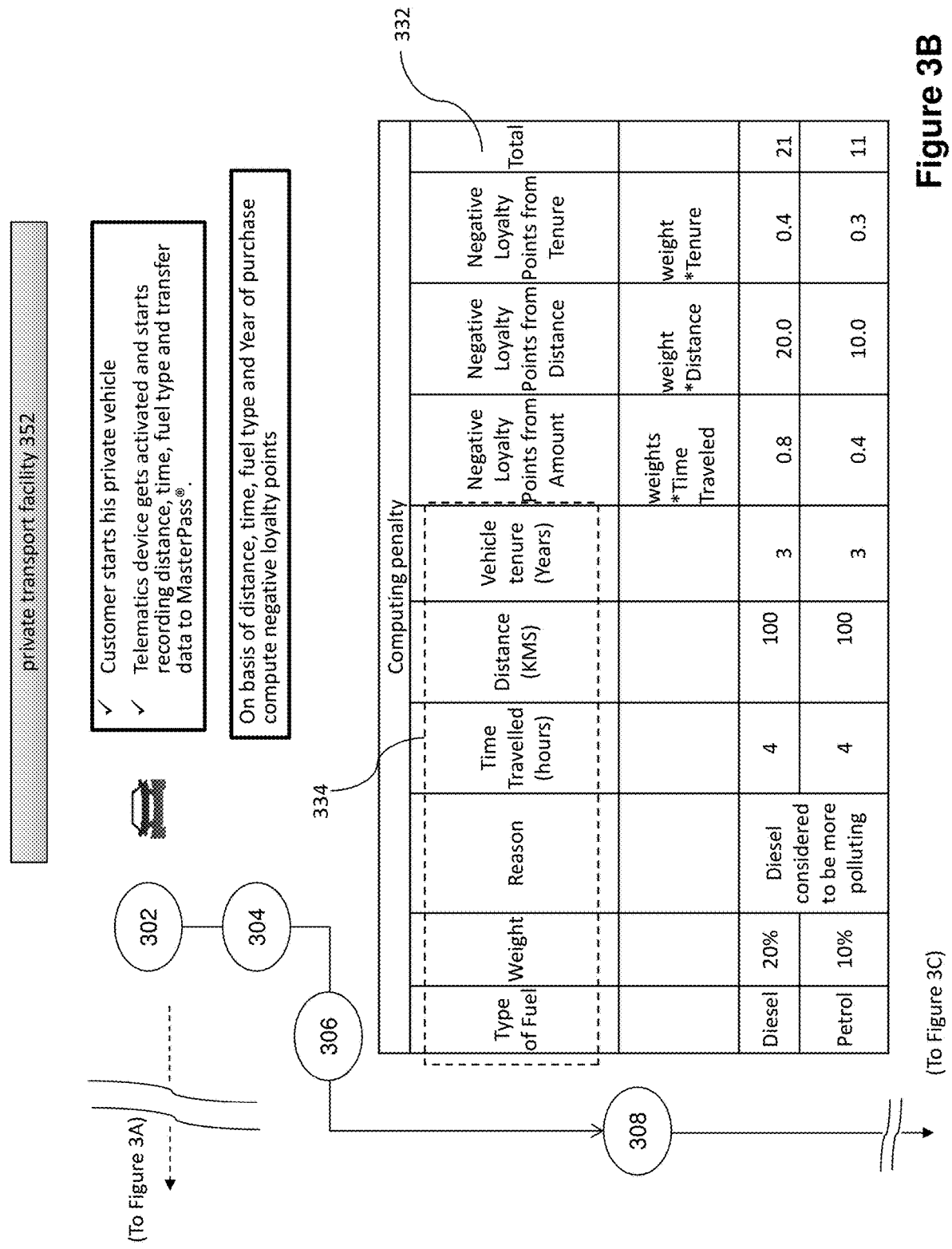
Figure 3C:
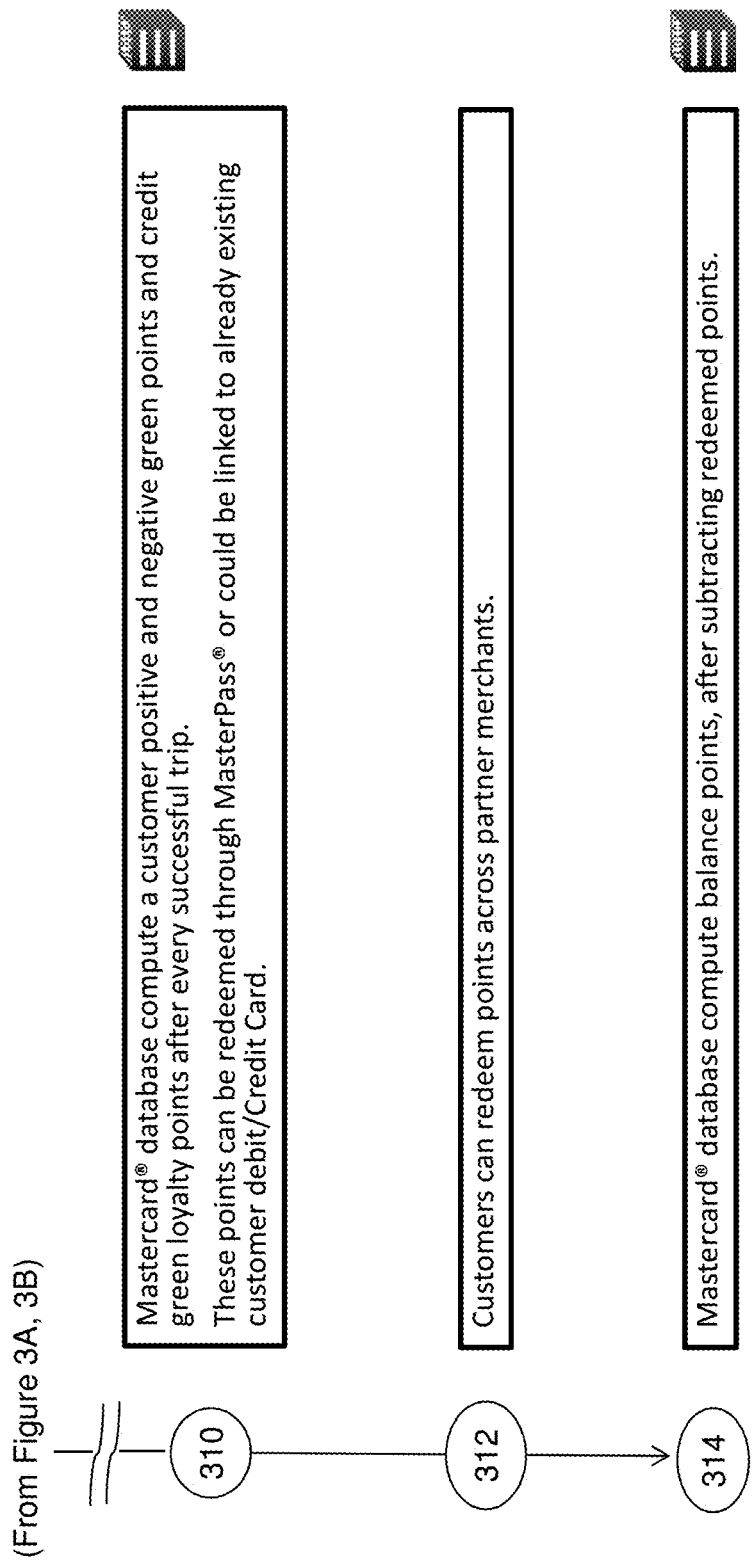

FIGS. 3A, 3B and 3C illustrate further detail on the stages that occur in each of the two travel options administered by the incentive program manager 102 of FIG. 1A, namely usage of a public transport facility 350 (which is rewarded) or usage of a private transport facility 352 (which is penalized), in accordance with one embodiment of the disclosure. FIG. 3A shows the stages 302, 304, 306 and 308 when a public transport facility 350 is used. FIG. 3B shows the stages 302, 304, 306 and 308 when a private transport facility 352 is used. FIG. 3C shows the stages 310, 312 and 314, which are common when either the public transport facility 350 or the private transport facility 352 is used.

At stage 302 of the public transport facility 350 usage, the start of a journey using public transport is captured. This is done by one of the following: i) the incentive program manager 102 detecting that the registered participant has purchased public transportation tickets using a digital wallet application that is configured to communicate with the incentive program manager 102; ii) a transport application configured to communicate with the incentive program manager 102 detecting that the registered participant has boarded a carpool facility or a cab; or iii) capture of a payment card, registered with the incentive program manager 102 through the digital wallet application, by a fare calculation entrance gantry of the public transport facility 350.

At stage 302 of the private transport facility 352 usage, the start of a journey using a privately owned vehicle is captured. This is done by, for example, from the incentive program manager 102 detecting that a telematics system installed in the private transport facility 352 has been activated either directly from the telematics system or from a mobile terminal application that has received this data from the telematics system.

At stage 304 of the public transport facility 350 usage, a global positioning system (GPS) application, which is either embedded or invoked by the transport application or the digital wallet application, tracks the distance that the public transport facility 350 travels. Similarly, at stage 304 of the private transport facility 352 usage, the vehicle telematics system tracks the distance that the private transport facility 352 travels.

At stage 306 of the public transport facility 350 usage, the incentive program manager 102 detects that the journey on the public transport facility 350 has ended. This may be done by the incentive program manager 102 receiving an appropriate message from the transport application, the digital wallet application or detection of capture of the payment card at a fare calculation exit gantry of the public transport facility 350. Details of the distance traveled by the public transport facility 350 and the mode of public transport are provided to the incentive program manager 102.

At stage 306 of the private transport facility 352 usage, the incentive program manager 102 similarly detects that the journey on the private transport facility 352 has ended. Details of the distance traveled by the private transport facility 352, along with specification data of the private transport facility 352 (such as the fuel used and the year of purchase) are provided to the incentive program manager 102.

At stage 308 of the public transport facility 350 usage, the incentive program manager 102 determines the reward 330 for usage of the public transport facility 350 by comparing such usage against one or more metrics 328 stored in a database. These metrics include the mode of transport, the public transport fare, the distance traveled and a weightage multiplier to account for the passenger carrying capacity of the used public transport facility 350. This weightage multiplier is bigger for public transport facilities that can carry more people since the carbon footprint contribution per passenger then decreases.

At stage 308 of the private transport facility 352 usage, the incentive program manager 102 determines the penalty 332 for usage of the private transport facility 352 by comparing such usage against one or more metrics 334 stored in a database. These metrics include the type of fuel, the time and distance traveled, the vehicle age and a weightage multiplier to account for the fuel type and the age of the used private transport facility 352. This weightage multiplier is bigger for private transport facilities that use diesel or are older since such vehicles have a larger carbon footprint contribution.

Stages 310 and 312 refer to administration of a member account, belonging to the registered participant, used to track the rewards and penalties from usage of the public transport facility 350 usage and the private transport facility 352.

At stage 310, the incentive program manager 102 provides, to a repository for recording incentives awarded in the incentive program, data indicative of the determined reward and the determined penalty. The incentive program manager 102 updates a balance in the member account maintained in the repository 108.

At stage 312, the incentive program manager 102 may receive a redemption request against the member account from the registered participant seeking to exchange the balance points for a good or service redeemable in the incentive program. At stage 314, the incentive program manager 102 updates a balance in the member account after the redemption request is processed.

Figure 4:
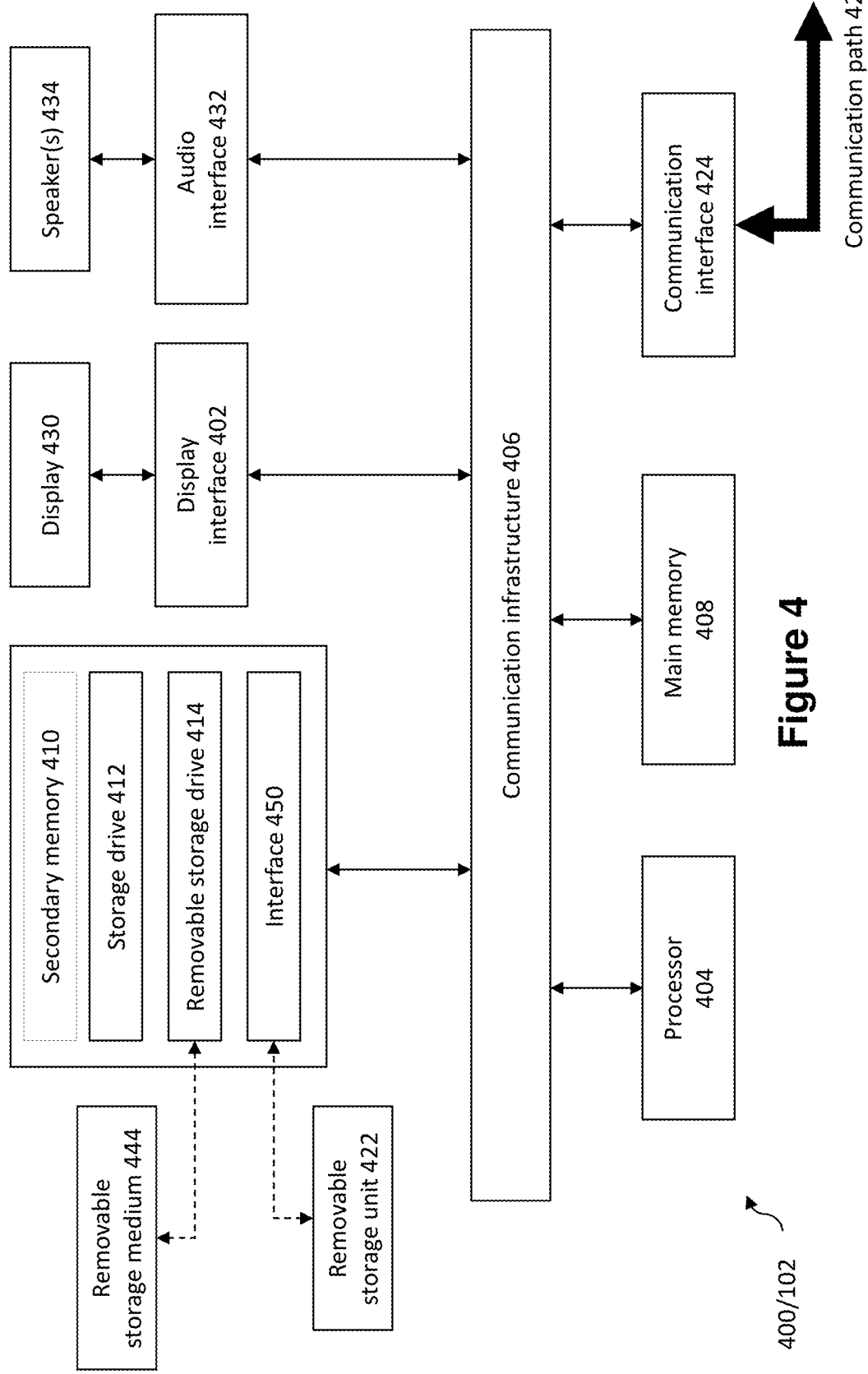
FIG. 4 shows a schematic of a computing device used to realize the incentive program manager shown in FIGS. 1A, 1B and 2.

FIG. 4 depicts an exemplary computing device 400, hereinafter interchangeably referred to as a computer system 400, where one or more such computing devices 400 may be used to implement the incentive program manager 102 shown in FIGS. 1A, 1B and 2. The following description of the computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a storage drive 412, which may be a hard disk drive, a solid state drive or a hybrid drive and/or a removable storage drive 414, which may include a magnetic tape drive, an optical disk drive, a solid state storage drive (such as a USB flash drive, a flash memory device, a solid state drive or a memory card), or the like. The removable storage drive 414 reads from and/or writes to a removable storage medium 444 in a well-known manner. The removable storage medium 444 may include magnetic tape, optical disk, non-volatile memory storage medium, or the like, which is read by and written to by removable storage drive 414. As will be appreciated by persons skilled in the relevant art(s), the removable storage medium 444 includes a computer readable storage medium having stored therein computer executable program code instructions and/or data.

In an alternative implementation, the secondary memory 410 may additionally or alternatively include other similar means for allowing computer programs or other instructions to be loaded into the computing device 400. Such means can include, for example, a removable storage unit 422 and an interface 450. Examples of a removable storage unit 422 and interface 450 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 422 and interfaces 450 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments of the disclosures, the communication interface 424 permits data to be transferred between the computing device 400 and a data communication network, such as a public data or private data communication network. The communication interface 424 may be used to exchange data between different computing devices 400 which such computing devices 400 form part of an interconnected computer network. Examples of a communication interface 424 can include a modem, a network interface (such as an Ethernet card), a communication port (such as a serial, parallel, printer, GPIB, IEEE 1394, RJ45, USB), an antenna with associated circuitry, and the like. The communication interface 424 may be wired or may be wireless. Software and data transferred via the communication interface 424 are in the form of signals which can be electronic, electromagnetic, optical or other signals capable of being received by communication interface 424. These signals are provided to the communication interface 424 via the communication path 426.

As shown in FIG. 4, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage medium 444, removable storage unit 422, a hard disk installed in storage drive 412, or a carrier wave carrying software over communication path 426 (wireless link or cable) to communication interface 424. Computer readable storage media refers to any non-transitory, non-volatile tangible storage medium that provides recorded instructions and/or data to the computing device 400 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card, such as a PCMCIA card, and the like, whether or not such devices are internal or external of the computing device 400. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites, and the like.

The computer programs (also called computer program code) are stored in main memory 408 and/or secondary memory 410. Computer programs can also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the storage drive 412, or the interface 450. The computer program product may be a non-transitory computer readable medium. Alternatively, the computer program product may be downloaded to the computer system 400 over the communications path 426. The software, when executed by the processor 404, causes the computing device 400 to perform functions of embodiments described herein.

It is to be understood that the embodiment of FIG. 4 is presented merely by way of example. Therefore, in some embodiments, one or more features of the computing device 400 may be omitted. Also, in some embodiments, one or more features of the computing device 400 may be combined together. Additionally, in some embodiments, one or more features of the computing device 400 may be split into one or more component parts. The main memory 408 and/or the secondary memory 410 may serve(s) as the memory for the incentive program manager 102; while the processor 404 may serve as the processor of the incentive program manager 102.

In the case of FIGS. 1A, 1B and 2 and in a first implementation, the memory (410, 408) contains computer program code, where the memory (410, 408) and the computer program code are configured to, with the processor 404, cause the incentive program manager 102 to receive, through an input port (realized, for example, by the communication interface 424) coupled to the processor 404, an indication of usage of a public transport facility by a participant registered with the incentive program and an indication of usage of a private transport facility registered with the incentive program and owned by the participant. The incentive program manager 102 is further configured to determine a reward to the participant for the usage of the public transport facility and a penalty for the usage of the private transport facility; provide, to a repository for recording incentives awarded in the incentive program, data indicative of the determined reward and the determined penalty; and update a balance in a member account maintained in the repository 108 with the determined reward and the determined penalty, the member account being linked to the participant registered with the incentive program 102.

The determination of the penalty may depend on an amount of carbon footprint contributed from the usage of the private transport facility. The determination of the reward may depend on any one or more of a passenger carrying capacity of the used private transport facility and a distance travelled during the usage of the public transport facility. The determination of the penalty and of the reward may include comparing the usage of the private transport facility and the usage of the public transport facility against one or more criteria stored in a database, the criteria being changeable through a command received by the incentive program manager.

The incentive program manager 102 is further configured to transmit, through an output port (realized, for example, by the communication interface 424) coupled to the processor 404, the data indicative of the determined reward and the determined penalty. The incentive program manager 102 is further configured to: transmit, through the output port 158, the data indicative of the determined reward and the determined penalty, and an instruction to update the balance in the member account to the repository 108.

The incentive program manager 102 is further configured to receive the indication of usage of the private transport facility through a telematics system installed in the private transport facility.

The incentive program manager 102 is further configured to receive the indication of usage of the public transport facility through any one or more of the following: scanning of a ticket issued for travel on the public transport facility; capture of a payment instrument used at a fare calculation sensor associated with the public transport facility, the payment instrument being owned by the participant registered with the incentive program; and a message received from a transport application activated during the usage of the public transport facility, the message containing data establishing a link to the participant registered with the incentive program.

The incentive program manager 102 is further configured to receive, through the input port 156, registration details of the private transport facility before receipt of the indication of the usage of the private transport facility.

The incentive program manager 102 is further configured to authenticate the usage of the private transport facility through identification of a match to the received registration details of the private transport facility.

The incentive program manager 102 is further configured to receive, through the input port 156, details of one or more public transport modes for enrollment under the public transport facility before receipt of the indication of the usage of the public transport facility.

The incentive program manager 102 is further configured to authenticate the usage of the public transport facility through identification of a match to one of the enrolled public transport modes.

The incentive program manager 102 is further configured to receive, through the input port 156, a redemption request against the member account; and update the balance in the member account after the redemption request is processed.

The incentive program manager 102 is further configured to establish whether the registered private transport facility is also registered for a public hire scheme; and convert the determined penalty into a reward when the establishment indicates that the usage of the registered private transport facility is under the public hire scheme.

In a second implementation, the memory (410, 408) contains computer program code, where the memory (410, 408) and the computer program code are configured to, with the processor 404, cause the incentive program manager 102 to receive, through an input port (realized, for example, by the communication interface 424) coupled to the processor 404, an indication of usage of a private transport facility registered with the incentive program and owned by a participant registered with the incentive program. The incentive program manager 102 is further configured to determine a penalty for the usage of the private transport facility; provide, to a repository for recording incentives awarded in the incentive program, data indicative of the determined penalty; and update a balance in a member account maintained in the repository account with the determined penalty, the member account being linked to the participant registered with the incentive program.

In this second implementation, the incentive program manager 102 is optionally configured to receive an indication of usage of a public transport facility by the participant registered with the incentive program and determine a reward to the participant for the usage of the public transport facility. The incentive program manager 102 is also further optionally configured to update the balance in the member account with the determined reward.

Similar to the first implementation, the incentive program manager 102 of the second implementation is further configured to receive the indication of usage of the private transport facility through a transponder signal originating from a telematics system installed in the private transport facility.

Figure 5:
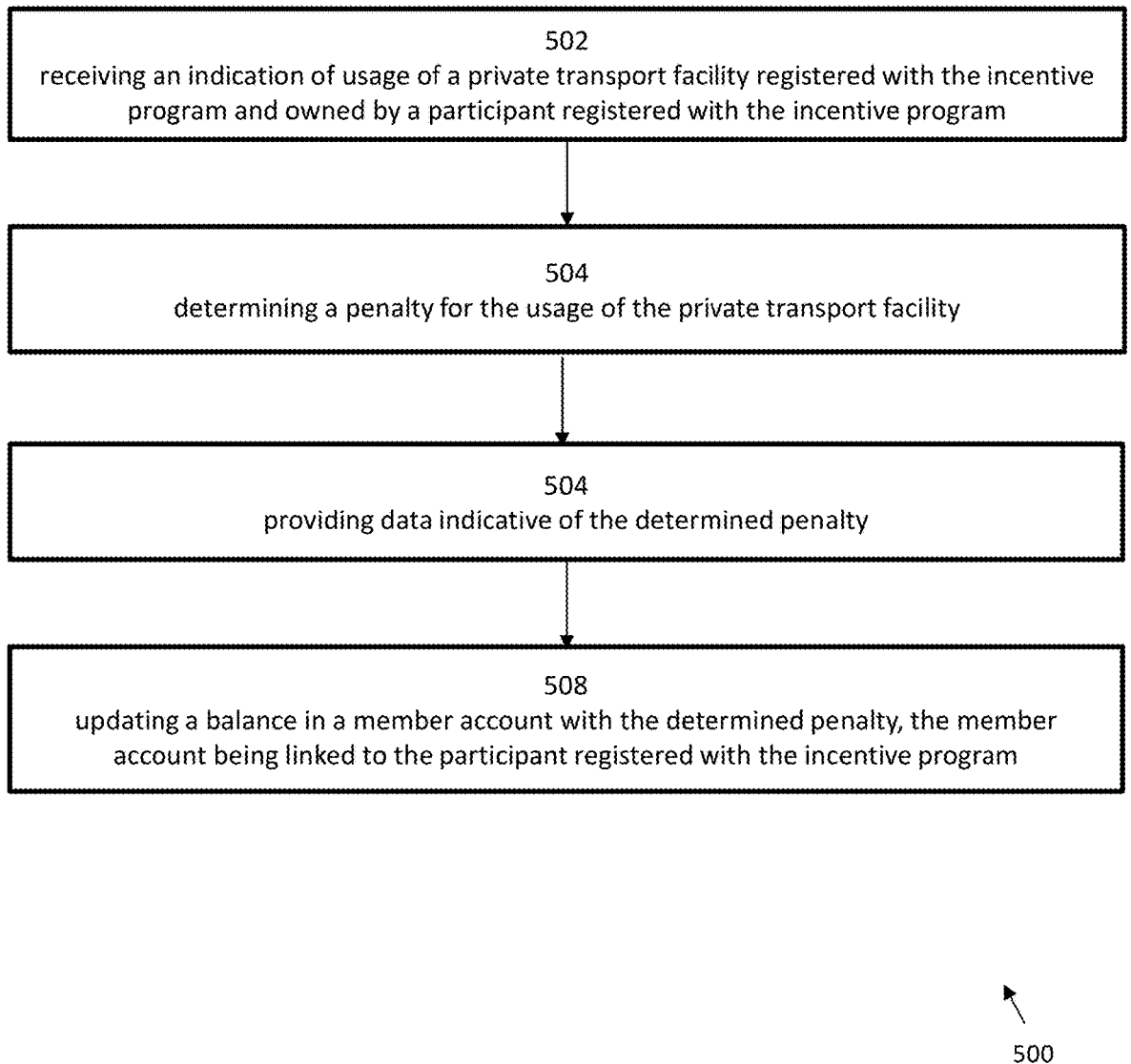
FIG. 5 shows a flowchart depicting steps for administering an incentive program for encouraging use of public transport.

FIG. 5 shows a flowchart depicting steps of a method 500 of administering an incentive program for encouraging use of public transport. The method 500 is performed by the incentive program manager 102 and computing device 400 of FIG. 4.

The method 500 includes a first step 502 of receiving an indication of usage of a private transport facility registered with the incentive program and owned by a participant registered with the incentive program. In one embodiment, the incentive program manager 102 receives the indication of usage of the private transport facility through a telematics system installed in the private transport facility.

A second step 504 involves determining a penalty for the usage of the private transport facility.

A third step 506 involves providing data indicative of the determined penalty. In one embodiment, the incentive program manager 102 provides the determined penalty to a repository for recording incentives awarded in the incentive program.

A fourth step 508 involves updating a balance in a member account with the determined penalty, the member account being linked to the participant registered with the incentive program. In one embodiment, the member account is maintained in the repository 108 for recording incentives awarded in the incentive program, whereby the incentive program manager 102 is configured to send an instruction to the repository 108 to perform the balance update.

The method 500 includes further steps which are not shown in FIG. 5. For instance, the method further includes receiving an indication of usage of a public transport facility by the participant; determining a reward to the participant for the usage of the public transport facility; providing data indicative of the determined penalty; and updating the balance in the member account with the determined reward.

The receiving of the indication of usage of the public transport facility is through any one or more of the following: scanning of a ticket issued for travel on the public transport facility; capturing of a payment instrument used at a fare calculation sensor associated with the public transport facility, the payment instrument being owned by the participant registered with the incentive program; and receiving a message from a transport application activated during the usage of the public transport facility, the message containing data establishing a link to the participant registered with the incentive program. The receiving of the indication of usage of the private transport facility is through a telematics system installed in the private transport facility.

The method 500 may further include establishing whether the registered private transport facility is also registered for a public hire scheme; and converting the determined penalty into a reward when the establishment indicates that the usage of the registered private transport facility is under the public hire scheme.

Some portions of the above description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium, such as exemplified in the GSM mobile telephone system. The computer program when loaded and executed on a computer effectively results in an apparatus that implements the steps of the preferred method.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in reducing a carbon footprint of a participant in a transport incentive program, the system comprising:
   a repository for recording incentives awarded to the participant in the incentive program, wherein the repository includes a member account linked to the participant registered with the incentive program;
   a database including public transportation metrics and private transportation metrics, wherein the public transportation metrics include at least one of: a mode of transport metric, a passenger carrying capacity metric, a public transport fare metric, and a public travel distance metric, and wherein the private transportation metrics include a private travel distance metric and at least one of: a fuel type metric, a travel duration metric, and a vehicle age metric;
   at least one processor in communication with the repository and the database;
   and at least one memory including computer program code, which when executed by the at least one processor, causes the at least one processor to:
   receive, from a usage transponder installed at a public transport facility, a public usage packet associated with travel of the participant by the public transport facility, the public usage packet including an identifier for the participant, an indication of at least a distance of the travel of the participant by the public transport facility, and a type of the public transport facility, wherein the type of the public transport facility includes at least one of a bus and a train; and
   receive, from a vehicle tracking device installed in a private vehicle, via a mobile device associated with the participant, a private usage packet associated with travel of the participant by the private vehicle, the private usage packet including an indication of usage of the private vehicle and the identifier for the participant, wherein the indication of usage of the private vehicle includes an indication of a distance of the travel of the participant by the private vehicle;
   compare the public usage packet to at least one of the public transportation metrics;
   authenticate said private vehicle as registered to the incentive program;
   in response to authentication of the private vehicle as registered to the incentive program, compare the private usage packet to at least two of the private transportation metrics;
   based on the comparisons:
      determine a reward for the participant for the usage of the public transport facility; and
      determine a penalty for the usage of the private vehicle;
   provide, to the repository, data indicative of the determined reward and the determined penalty; and
   based on the identifier for the participant, update a balance in the member account with the determined reward and the determined penalty, whereby the participant is rewarded and/or penalized based on a carbon footprint associated with use of the public transport facility and/or the private vehicle by the participant.

2. The system of claim 1, further comprising an output port coupled to the at least one processor,
   wherein the computer program code, when executed by the at least one processor, causes the at least one processor to transmit, through the output port, the data indicative of the determined reward and the determined penalty and an instruction to update the balance in the member account to the repository.

3. The system of claim 1, wherein the determination of the penalty depends on an amount of the carbon footprint contributed from travel of the participant by the private vehicle.

4. The system of claim 1, wherein the determination of the reward depends on a passenger carrying capacity of the used public transport facility and a distance travelled during the travel of the participant by the public transport facility.

5. The system of claim 1, wherein the public transportation metrics and the private transportation metrics are changeable through a command received by the system.

6. The system of claim 1, wherein the computer program code, when executed by the at least one processor, causes the at least one processor to receive, via an input port, registration details of the private vehicle, from the mobile device, before receipt of the private usage packet.

7. The system of claim 1, wherein the computer program code, when executed by the at least one processor, causes the at least one processor to receive, via an input port, details of one or more public transport modes for enrollment under the public transport facility before receipt of the public usage packet from the usage transponder of the public transport facility.

8. The system of claim 7, wherein the computer program code, when executed by the at least one processor, causes the at least one processor to authenticate the usage of the public transport facility through identification of a match to one of the enrolled public transport modes.

9. The system of claim 1, wherein the computer program code, when executed by the at least one processor, causes the at least one processor to receive, via an input port, a redemption request against the member account; and
   wherein the computer program code, when executed by the at least one processor, causes the at least one processor to update the balance in the member account after the redemption request is processed.

10. The system of claim 1, wherein the computer program code, when executed by the at least one processor, causes the at least one processor to:
    establish whether the registered private vehicle is also registered for a public hire scheme; and
    convert the determined penalty into a reward when the establishment indicates that the private usage packet is under the public hire scheme.

11. A computer-implemented method for use in reducing a carbon footprint of a participant in a transport incentive program, the method comprising:
    receiving, by an input port coupled to at least one processor, from a vehicle tracking device installed in a private vehicle, via a mobile device associated with a participant registered with the incentive program, a private usage packet associated with travel of the participant by the private vehicle, the private usage packet including an identifier for the participant and, an indication of a distance of travel of the participant;

receiving, by the input port, from a usage transponder installed at a public transport facility, a public usage packet, the public usage packet including an indication of at least a distance of travel of the participant by the public transport facility, and a type of the public transport facility, the type public transport facility including at least one of a bus and a train;

authenticating, by the at least one processor, said private vehicle as registered to the incentive program;

in response to authenticating the private vehicle as registered to the incentive program, comparing, by the at least one processor, the private usage packet to at least two private transportation metrics including a travel distance metric and at least one of: a fuel type metric, a travel duration metric, and a vehicle age metric;

comparing, by the at least one processor, the public usage packet to one or more public transportation metrics;

based on the comparisons:
    determining, by the at least one processor, a penalty for the usage of the private vehicle; and
    determining, by the at least one processor, a reward for the usage of the public transport facility;

providing, by the at least one processor, to a repository maintaining a member account linked to the participant, data indicative of the determined penalty and data indicative of the determined reward; and based on the identifier for the participant, updating a balance in the member account with the determined penalty and with the determined reward.

12. The method of claim 11, further comprising:
establishing whether the registered private vehicle is also registered for a public hire scheme; and
converting the determined penalty into a reward when the establishment indicates that the private usage packet is under the public hire scheme.

13. The system of claim 1, wherein the payment instrument includes at least one of a payment card and/or a digital wallet.

14. The method of claim 11, wherein the private usage packet further includes a fuel type of the private vehicle and an age of the private vehicle; and
wherein comparing the private usage packet includes comparing the private usage packet to the travel distance metric, the fuel type metric and the vehicle age metric.

* * * * *